(12) United States Patent
Overberg

(10) Patent No.: US 6,412,149 B1
(45) Date of Patent: Jul. 2, 2002

(54) C-CLIP FOR SHROUD ASSEMBLY

(75) Inventor: John H. Overberg, Fairfield, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/383,133

(22) Filed: Aug. 25, 1999

(51) Int. Cl.$^7$ .................................................. A41F 1/00
(52) U.S. Cl. ....................... 24/455; 24/3.12; 24/20 R; 24/458; 24/563; 292/DIG. 73; 415/116; 415/134
(58) Field of Search ................................ 24/20 R, 455, 24/458, 541, 563; 292/DIG. 73

(56) References Cited

U.S. PATENT DOCUMENTS

| 1,604,627 A | * | 10/1926 | Bacher, Jr. | ............ | 292/DIG. 73 |
| 1,741,354 A | * | 12/1929 | Axe | ..................... | 292/DIG. 73 |
| 2,539,064 A | * | 1/1951 | Ernest | ................. | 292/DIG. 73 |
| 3,583,824 A | * | 6/1971 | Smuland | ..................... | 415/134 |
| 3,777,953 A | * | 12/1973 | Lewis | ........................ | 224/4 C |
| 4,062,490 A | * | 12/1977 | Hixson | ........................ | 238/338 |
| 4,303,371 A | * | 12/1981 | Eckert | ........................ | 415/116 |
| 4,712,850 A | * | 12/1987 | Seidler | ........................ | 439/861 |
| 5,046,952 A | * | 9/1991 | Cohen et al. | .................. | 439/63 |
| 5,331,721 A | * | 7/1994 | Raum, Sr. | ..................... | 24/3.12 |
| 5,537,294 A | * | 7/1996 | Siwinski | ..................... | 361/753 |
| 5,804,875 A | * | 9/1998 | Remsburg et al. | .......... | 257/718 |
| 5,836,097 A | * | 11/1998 | Lewis et al. | ................... | 24/563 |
| 5,930,114 A | * | 7/1999 | Kuzmin et al. | ............. | 361/704 |
| 6,034,344 A | * | 3/2000 | Lttleson et al. | .......... | 219/76.14 |
| 6,094,301 A | * | 7/2000 | Dreyer et al. | ................ | 359/396 |

FOREIGN PATENT DOCUMENTS

| EP | 0280832 | * | 9/1988 | .................. | 24/455 |
| GB | 2168419 | * | 6/1986 | .................. | 24/455 |
| JP | 4008597 | * | 1/1992 | .................. | 24/455 |

* cited by examiner

Primary Examiner—Victor N. Sakran
(74) Attorney, Agent, or Firm—Andrew C. Hess; Rodney M. Young

(57) ABSTRACT

Disengagement of C-clips in turbine shroud assemblies is prevented by providing each C-clip with at least one anti-rocking pad. The anti-rocking pad is disposed on a radially inner surface of the C-clip so as to make snug contact with a portion of the shroud adjacent to the C-clip. The snug contact limits rocking motion of the C-clip, thereby preventing C-clip disengagement.

24 Claims, 3 Drawing Sheets

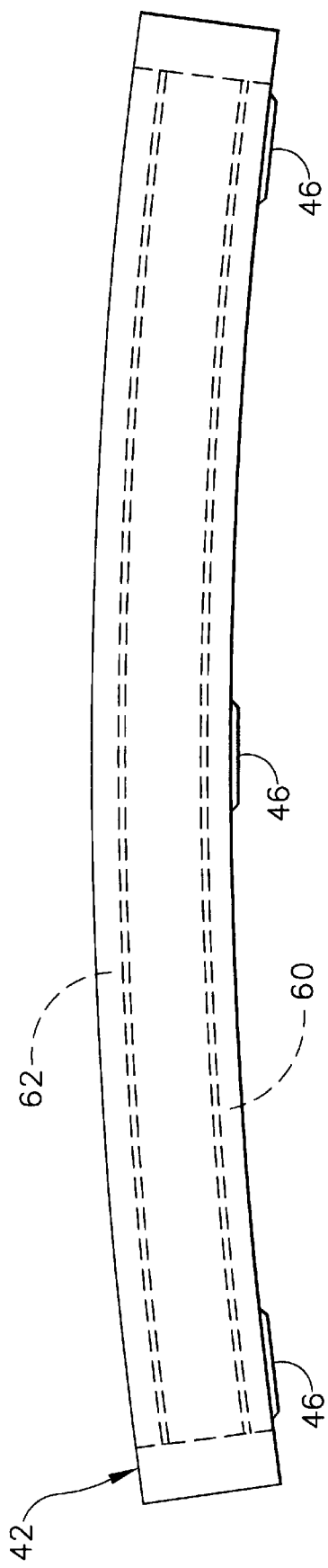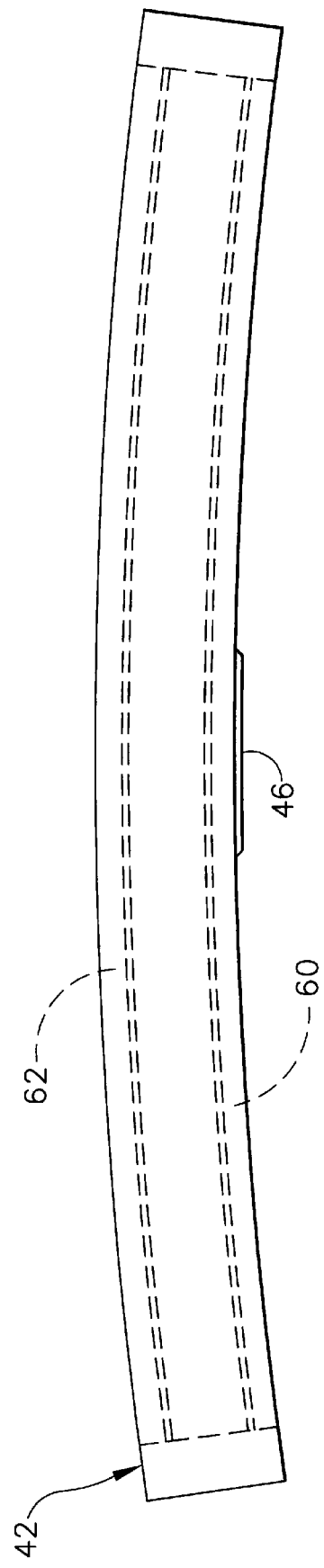

C-CLIP FOR SHROUD ASSEMBLY

STATEMENT REGARDING FEDERALLY SPONSORED RESEARCH & DEVELOPMENT

The U.S. Government may have certain rights in this invention pursuant to contract number F33657-95-C-0055 awarded by the Department of the Air Force.

BACKGROUND OF THE INVENTION

This invention relates generally to gas turbine engines and more particularly to shroud assemblies utilized in the high pressure turbine section of such engines.

A gas turbine engine includes a compressor that provides pressurized air to a combustor wherein the air is mixed with fuel and ignited for generating hot combustion gases. These gases flow downstream to one or more turbines that extact energy therefrom to power the compressor and provide useful work such as powering an aircraft in flight A turbine section commonly includes a stationary turbine nozzle disposed at the outlet of the combustor for channeling combustion gases into a turbine rotor disposed downstream thereof. The turbine rotor indudes a plurality of circumferentially spaced apart fan blades extending radially outwardly from a rotor disk that rotates about the centerline axis of the engine.

The turbine section further includes a shroud assembly located immediately downstream of the turbine nozzle. The shroud assembly closely surrounds the turbine rotor and thus defines the outer boundary for the hot combustion gases flowing through the turbine. A typical shroud assembly comprises a shroud support which is fastened to the engine outer case and which in turn supports a plurality of shrouds. The shrouds are held in place, in part, by arcuate retaining members commonly referred to as C-clips. Specifically, the C-clips hold the aft end of the shrouds in place against the shroud hangers via an interference fit.

The interference fit normally provides excellent retention of the shrouds. However, there can be a tendency for the C-clips to back off in some instances because of a thermal ratcheting phenomenon. That is, although the shrouds and C-clips are segmented to accommodate for thermal expansion, there is a possibility that the thenmal loads within the shroud assembly can cause the C-clip to rock and thereby overcome the interference fit clamp loads. In some cases, there may be enough of a gap between the C-clip aft face and the adjacent nozzle outer band to allow for C-clip disengagement Such disengagement could result in severe hardware damage.

Accordingly, there is a need for a C-clip design that eliminates C-clip back-off.

SUMMARY OF THE INVENTION

The above-mentioned needs are met by the present invention which provides a C-clip having at least one anti-rocking pad disposed thereon. The anti-rocking pad makes snug contact with the portion of the shroud adjacent to the C-clip so as to limit arny rocking motion of the C-clip, thereby preventing C-clip disengagement.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing FIGS. in which:

FIG. 4 is an aft-looking-forward end view showing a first embodiment of the C-clip of the present invention.

FIG. 5 is an aft-looking-forward end view showing a second embodiment of the C-clip of the present invention.

DETAILED DESCRIPTION OF THE INVENTION

Figure 1:
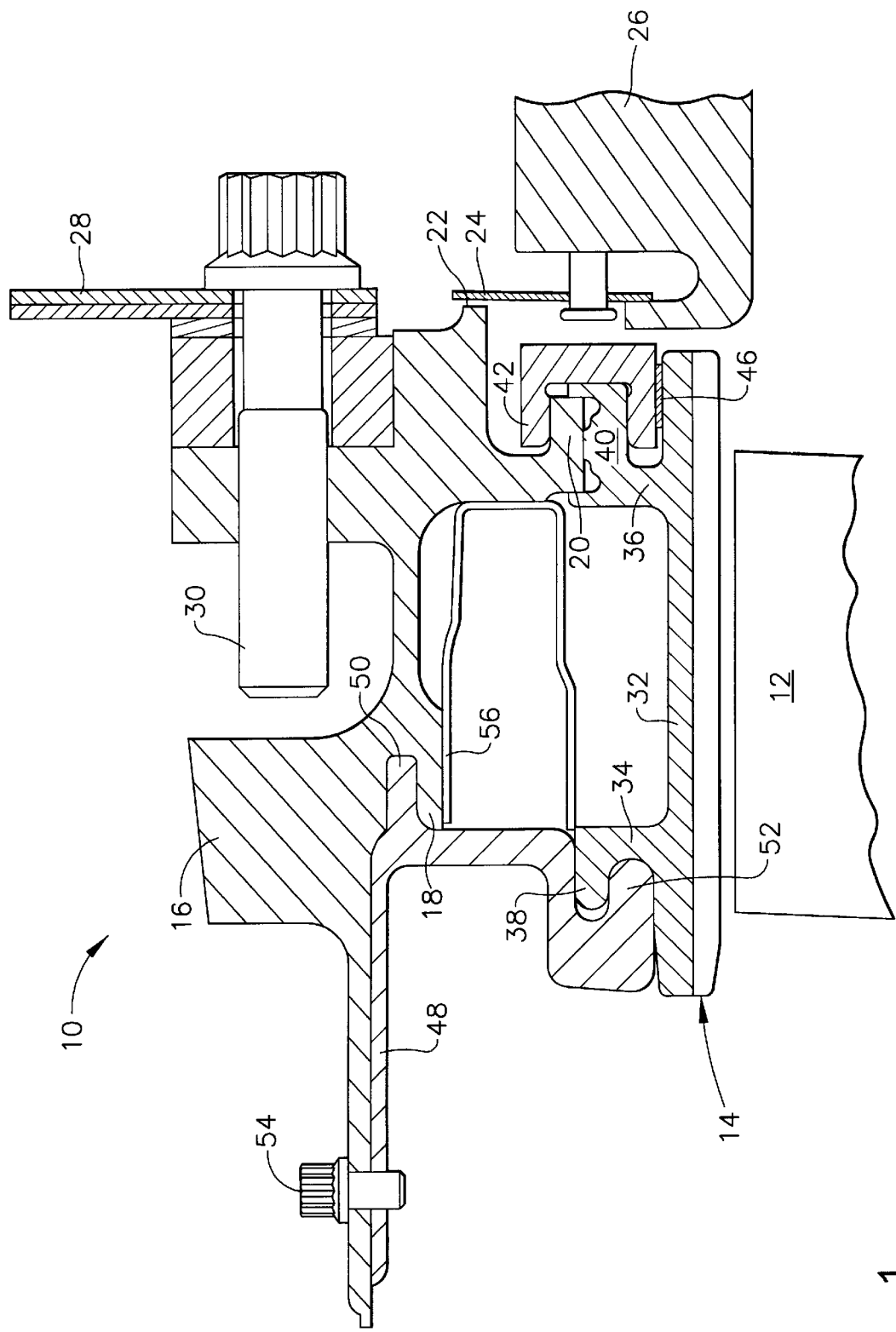
FIG. 1 is an axial sectional view of a shroud assembly including the C-clip of the present invention.

Referring to the drawings wherein identical reference numerals denote the same elements throughout the various views, FIG. 1 shows a shroud assembly 10 in closely surrounding relation with turbine blades 12 carried by a rotor disk (not shown) in the high pressure turbine section of a gas turbine engine. The shroud assembly 10 includes a plurality of arcuate shrouds 14 (only one shown in FIG. 1) arranged in an annular array so as to encircle the turbine blades 12. The shrouds 14 are held in position by a shroud support 16 which, in turn, is supported by the engine outer case (not shown) in a conventional manner.

The shroud support 16 includes an axially extending forward hook 18 and an axially extending aft hook 20. The shroud support 16 also has an aft lip wear surface 22 formed on its aft face. The aft lip wear surface 22 provides a contact surface for a leaf seal 24 which is disposed between the shroud assembly 10 and the nozzle outer band 26 of the adjacent stator assembly. A conventional flow divider 28 is attached to the shroud support 16 via bolts 30.

Each shroud 14 includes a base 32 having radially outwardly extending forward and aft rails 34 and 36, respectively. A forward mounting flange 38 extends forwardly from the forward rail 34 of each shroud 14, and an aft mounting flange 40 extends rearwardly from the aft rail 36 of each shroud 14. The aft mounting flanges 40 of each shroud 14 are juxtaposed with the aft hook 20 of the shroud support 16 and are held in Icace by a plurality of retaining members 42 commonly referred to as C-clips.

The C-clips 42 comprise arcuate body members that are C-shaped in cross section and snugly overlap the aft mounting flanges 40 and the aft hook 20 so as to clamp the aft ends of the shrouds 14 in place against the shroud support 16. Although they could be formed as a single continuous ring, the C-clips 42 are preferably segmented to accommodate thermal expansion. Typically, one C-clip 42 clamps an entire shroud plus one-half of each adjacent shroud. In which case, there are twice as many shrouds 14 as there are Iclips 42.

As mentioned above, repetitive thermal expansion and contraction can sometimes cause conventional C-clips to rock with respect to their associated mounting flanges and hooks. If unchecked, such rocking could cause C-clip disengagement. To counter the rocking effect, at least one anti-rocking pad 46 is disposed on the radially inner surface (with respect to the centerline axis of the engine) of the C-clip 42. As described in more detail below, the antirocking pad 46 contacts the shroud 14 so as to limit the C-clip's capacity to rock.

The forward end of each shroud 14 is supported from the shroud support 16 via conventional shroud hangers 48. Each shroud hanger 48 includes a first hook 50 that engages the forward hook 18 of the shroud support 16 and a second hook 52 that engages the forward mounting flange 38 of each shroud 14. The shroud hangers 48 are also secured to the shroud support 16 by fasteners 54. A conventional cooling air distributor 56 is disposed between the shroud 14 and the shroud support 16 for distributing cooling air to the shrouds 14 and adjacent structure. It should be noted that the present invention is not limited to the shroud assembly shown in FIG. 1. In other shroud assemblies, the aft end of the shroud is clamped to a shroud hanger, instead of directly to a shroud support, via a C-clip. The C-clip of the present invention is equally applicable to this type of configuration or any other type of shroud supporting structure that uses a C-clip.

Figure 2:
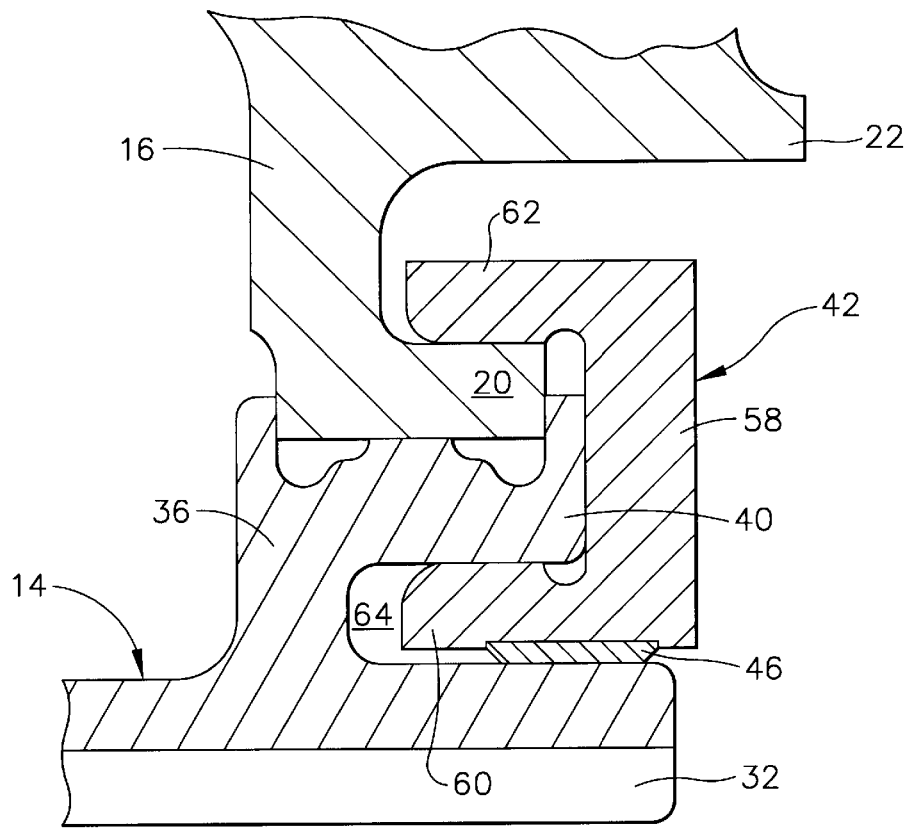
FIG. 2 is an enlarged sectional view of the shroud assembly of FIG. 1 showing the C-clip in mote detail.
Figure 3:
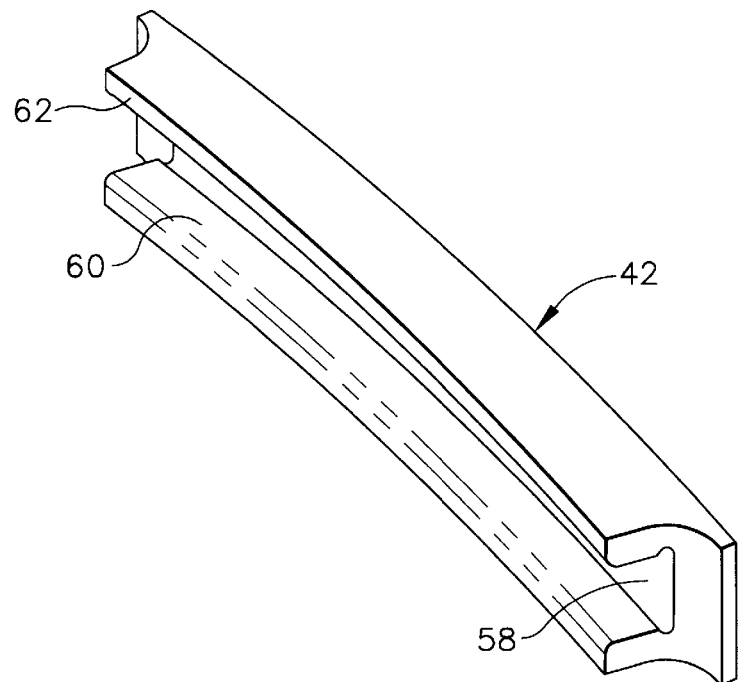
FIG. 3 is a perspective view of the C-clip of FIG. 2.

Referring to FIGS. 2 and 3, a C-clip 42 is shown in greater detail. As mentioned above, each C-clip 42 comprises an arcuate body member that is C-shaped in cross section. Specifically, the C-clip 42 includes a connector portion 58 having first and second tines 60, 62 extending therefrom, with the first tine 60 being located radially inside of the second tine 62. The second tine 62 engages the aft hook 20, and the first tine 60 engages the aft mounting flange 40. To engage the aft mounting flange 40, the first tine 60 is located in a gap 64 formed between the aft nmounting flange 40 and the rearmost portion of the shroud base 32.

The anti-rocking pad 46 is disposed on the radially inner surface of the first fine 60 so as to be located between the C-clip 42 and the shroud base 32. The thickness of the anti-rocking pad 46 is such that it will contact the shroud base 32. That is, the combined thickness of the first tine 60 and the anti-rocking pad 46 is substantially equal to the width of the gap 64. Typically, the thickness of the antirocking pad 46 will be in the range of about 0.01–0.02 inches.

The firm contact between the anti-rocking pad 46 and the base 32 of the shroud 14 limits the capacity the C-clip 42 to rock with respect to the aft hook 20 and the aft mounting flange 40. Accordingly, the anti-rocking pad 46 reduces the possibility of C-clip disengagement. To best eliminate C-clip rocking action, the anti-rocking pad 46 is preferably located near the aft end of the C-clip 42. The anti-rocking pad 46 can be made of any suitable material and is preferably made of the same material as the C-clip 42. The anti-rocking pad 46 can be a separate element attached to the C-clip 42 by conventional means such as welding or bonding, or it can be integrally formed with the C-clip 42.

Turning to FIG. 4, it can be seen, in one preferred ernbodiment, that the anti-rocking pad 46 is drcumferentially centered on the radially inner surface of the first Une 60. That is, the anti-rocking pad 46 is located about midway between the opposing ends of the C-clip 42. FIG. 5 shows anothe- preferred embodiment in which three anti-rocking pads 46 are disposed on the radially inner surface of the first tine 60. One anti-rocking pad 46 is located midway between the opposing ends of the C-clip 42, a second anti-rocking pad 46 is located near a first end of the C-clip 42 and a third anti-rocking pad 46 is located near the other end of the C-clip 42. The multiple anti-rocking pads of FIG. 5 are generally not as wide as the single anti-rocking pad of FIG. 4.

The foregoing has described a C-clip having an anti-rocking pad that eliminates C-clip back-off. In addition to eliminating the potential of C-clip disengagement, the C-clip of the present invention provides further advantages in that it requires only limited modification to existing C-clip configurations and requires essentially no modification to other shroud assembly structure. While specific embodiments of the present invention have been described, it will be apparent to those skilled in the art that various modifications thereto can be made without departing from the spirit and scope of the invention as defined in the appended claims.

What is claimed is:

1. A C-clip for clamping at least one shroud to its supporting structure in a shroud assembly of a gas turbine engine, said C-clip having an anti-rocking pad disposed on a first surface thereof, said anti-rocking pad having a raised contact surface that is parallel to said first surface.

2. The C-clip of claim 1 wherein said first surface is a radially inner surface of said C-clip.

3. The C-clip of claim 2 wherein said anti-rocking pad is centered on said first surface.

4. The C-clip of claim 3 further comprising a second anti-rocking pad disposed near one end of said C-clip and a third anti-rocking pad disposed near another end of said C-clip.

5. The C-clip of claim 1 wherein said anti-rocking pad contacts said at least one shroud.

6. A C-clip for clamping at least one shroud to its supporting structure in a shroud assembly of a gas turbine engine, said C-clip comprising:
   a body member having first and second tines wherein said first tine is located radially inside of said second tine and has a radially inner surface; and
   an anti-rocking pad being disposed on said radially inner surface.

7. The C-clip of claim 6 wherein said anti-rocking pad contacts said at least one shroud.

8. The C-clip of claim 6 wherein said body member defines first and second ends and said anti-rocking pad is located midway between said first and second ends.

9. The C-clip of claim 8 further comprising a second anti-rocking pad disposed on said first tine, near said first end and a third anti-rocking pad disposed on said first tine, near said second end.

10. The C-clip of claim 6 wherein said body member and said anti-rocking pad are made of the same material.

11. The C-clip of claim 6 wherein said anti-rocking pad is attached to said body member.

12. The C-clip of claim 6 wherein said anti-rocking pad is integrally formed with said body member.

13. A C-clip for clamping at least one shroud to its supporting structure in a shroud assembly of a gas turbine engine, said C-clip comprising:
   a body member having first and second tines wherein said first tine is located radially inside of said second tine and has a radially inner surface; and
   an anti-rocking pad disposed on said first tine, said anti-rocking pad being disposed on said radially inner surface.

14. The C-clip of claim 13 wherein said anti-rocking pad contacts said at least one shroud.

15. The C-clip of claim 13 wherein said body member defines first and second ends and said anti-rocking pad is located midway between said first and second ends.

16. The C-clip of claim 15 further comprising a second anti-rocking pad disposed on said first tine, near said first end and a third anti-rocking pad disposed on said first tine, near said second end.

17. The C-clip of claim 13 wherein said body member and said anti-rocking pad are made of the same material.

18. The C-clip of claim 13 wherein said anti-rocking pad is attached to said body member.

19. The C-clip of claim 13 wherein said anti-rocking pad is integrally formed with said body member.

20. A method of preventing rocking of a C-clip in a shroud assembly of a gas turbine engine having at least one shroud, said method comprising:

providing a C-clip having a body having first and second tines, wherein said first tine is located radially inside of said second tine and has a radially inner surface; and disposing an anti-rocking pad on said radially inner surface.

21. The method of claim 20 further comprising disposing a second anti-rocking pad disposed on said first tine, near said first end and disposing a third anti-rocking pad disposed on said first tine, near said second end.

22. The method of claim 20 wherein said anti-rocking pad is placed in contact with said at least one shroud.

23. A shroud assembly in a gas turbine engine, said shroud assembly comprising:

shroud supporting structure;

at least one shroud mounted to said shroud supporting structure; and at least one C-clip for clamping said at least one shroud to said shroud supporting structure, said C-clip having an anti-rocking pad disposed thereon.

24. The shroud assembly of claim 23 wherein said anti-rocking pad contacts said at least one shroud.

\* \* \* \* \*